July 9, 1963   H. L. REINSMA ETAL   3,096,661
TWO-PIECE MASTER TRACK LINK
Filed Nov. 6, 1961   2 Sheets-Sheet 1

INVENTORS
HAROLD L. REINSMA
FLOYD S. DADDS
BY
ATTORNEYS

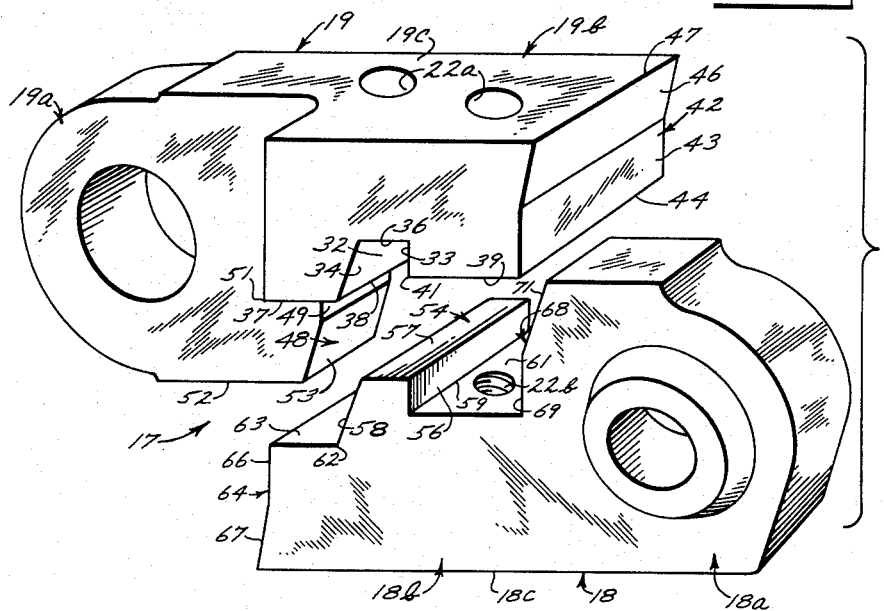
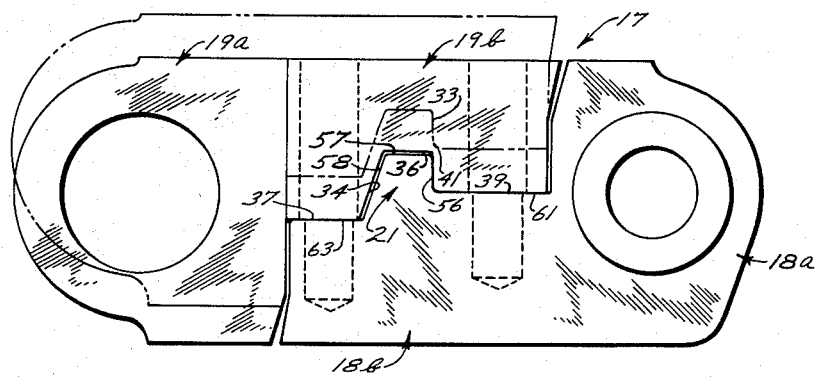

3,096,661
TWO-PIECE MASTER TRACK LINK
Harold L. Reinsma, Pekin, and Floyd S. Dadds, Peoria, Ill., assignors to Caterpillar Tractor Co., Peoria, Ill., a corporation of California
Filed Nov. 6, 1961, Ser. No. 150,385
4 Claims. (Cl. 74—258)

This invention relates to master links of the type used in chains, track-type tractor tracks, and other articulated devices. The invention is particularly adaptable for use with the articulated endless track of a track-type vehicle and will be described by reference to such use herein though its adaptability to other similar uses will be made apparent as the description proceeds.

An endless track for track-type vehicles comprises a plurality of track shoes carried by links which are pivotally connected by means of pins. It is conventional practice to provide at least one master pin in the track assembly having suitable means for retaining it securely in place and still permitting removal of the pin for disassembly of the endless track from the vehicle. Master pin connections have in many cases proven insecure and are often subject to corrosion making disassembly difficult.

To eliminate certain problems involved with master track pins, master track links have been considered to allow the elimination of master track pins altogether.

A master track link generally provides a separable connection between a pair of adjacent track pins. The master link should provide a connection which is simple enough to permit servicing of the track in the field without the use of special tools, yet strong enough to stand up under the stresses experienced during tractor operation.

Accordingly, it is an object of the present invention to provide a master link for an endless track.

A further object of the invention is to provide a master link for an endless track which allows relatively easy connection and disconnection of the track without the use of special tools, and is self-aligning upon connection.

Further and more specific objects and advantages of the invention are made apparent in the following specification wherein a preferred form of the invention is described by reference to the accompanying drawing.

In the drawing:

FIG. 4 is an isometric view of the master link of the invention, show in a separated condition; and FIG. 5 is a side elevation of the master link illustrating the manner in which the link operates.

Figure 1:
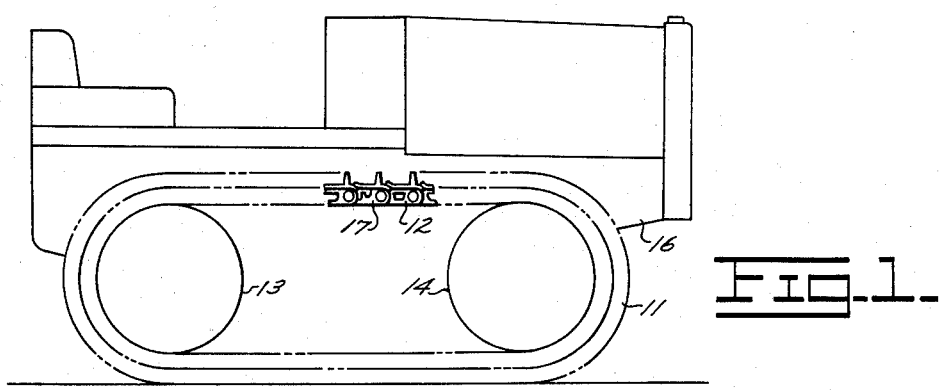
FIG. 1 is a schematic side elevation view of a track-type tractor including an endless track.

Referring now to FIG. 1, the endless track mechanism 11 which comprises a plurality of pivotally connected links 12 passes over drive sprocket 13 and front idler 14 of tractor 16. At least one master track link 17 is provided in the endless track mechanism to allow the track to be removed from the sprocket and idler for repair or replacement.

Figure 2:
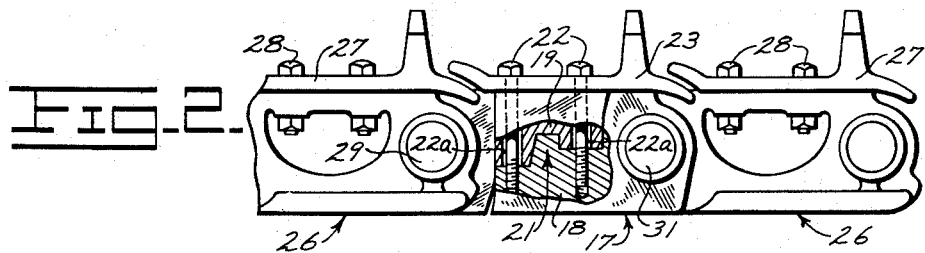
FIG. 2 is a fragmentary side elevation of the tractor track with portions broken away to disclose structural features of the master link.

Referring to FIG. 2, master track link 17 comprises two overlapping half-links 18 and 19 interlocked by a keyed notch joint 21. A pair of long cap screws 22 pass through a track shoe 23, bores 22a and half-link 19 and threadably engage half-link 18. In this manner, cap screws 22 secure shoe 23 to link 17 and also assure positive connection between half links 18 and 19 at joint 21.

The construction of joint 21 prevents the transmission of shear forces to the cap screws when the link 17 is under tension transmitted through track pins 29 and 31 which connect it with adjacent conventional links such as shown at 26 having the usual shoes 27 secured thereto as by bolts 28. Shear forces even of sufficient magnitude to deform the cap screws slightly might necessitate special tools not available in the field for their removal.

Figure 3:
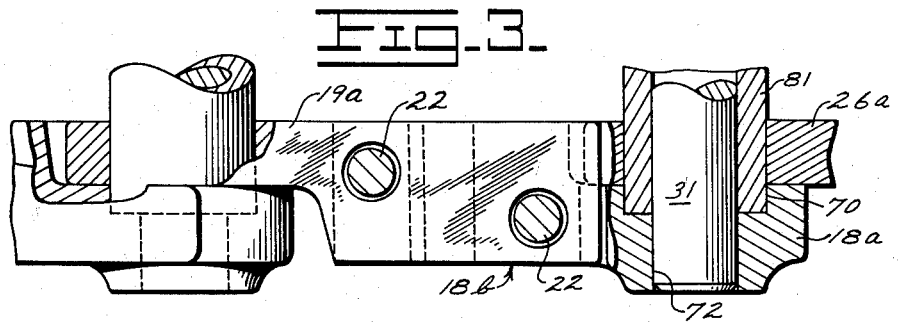
FIG. 3 is a fragmentary top elevation view partly in section of the master link.

Reference to FIGS. 3, 5 and particularly 4, enables the geometry of the separable link of the present invention and the advantages gained thereby to be clearly pointed out. Half-link 19 forming one-half of the master link 17 has a track pin bearing area 19a integrally connected to a wider connection area 19b. Areas 19a and 19b form a continuous surface 19c on which track shoe 23 (FIG. 2) is secured, and contains bores 22a for reception of cap screws 22 (FIG. 2). While area 19b is wider than area 19a it has a thickness perpendicular to surface 19c which is only approximately one-half the thickness of area 19a. This allows half-link 19 to mate with half-link 18 to form a link 17 having the same general thickness as the rest of track 11 (FIG. 1), as will be described in greater detail.

Connection area 19b has a transversely extending notch 32 formed in its lower portion throughout its entire width. Notch 32 has two generally vertical side walls 33, 34 perpendicular to surface 19c, and top surface 36 generally parallel to surface 19c. Vertical wall 33 forms the boundary of notch 32 furthest removed from area 19a. Wall 34, which forms the other vertical boundary, is inclined from the vertical in the general direction of wall 33. A flat machined surface 37, generally parallel to surface 19c, extends toward area 19a from the lower edge 38 of wall 34 and is lower relative to surface 19c than a machined surface 39, which extends from edge 41 of wall 33 in a direction away from area 19a while parallel to surface 19c. Surfaces 39 and 19c are separated by generally vertical end surface 42 of member 19. End surface 42 is divided into an end surface portion 43 which rises vertically from edge 44 of surface 39 approximately half-way to surface 19c, and end surface portion 46 which is inclined from the vertical similarly to wall 34 of notch 32, and extends from end surface portion 43 to edge 47 of surface 19c.

Below area 19b on area 19a is a generally vertical end mating surface 48 having a vertical portion 49 which extends from edge 51 of surface 37 approximately half way to track surface 52 of area 19a. An inclined portion 53 of surface 48 extends between portion 49 and track surface 52 and is inclined from the vertical in a manner similar to surface 46 and wall 34.

Half-link 18 provides a mating member for half-link 19. Half-link 18 has a pin bearing area 18a integral with a wider connection area 18b. Areas 18a and 18b form a continuous surface 18c upon which track rollers bear when the link is part of a track in operation. While area 18b is wider than area 18a (best shown in FIG. 3) it has a thickness perpendicular to surface 18c which is only approximately one-half the thickness of area 18a measured in the same way.

Connection area 18b has a generally vertical transversely extending key 54. Key 54 is designed to mate with notch 32 and accordingly has a vertical wall 56, a top surface 57 parallel to surface 18c and a longer wall 58 which is inclined from the vertical in the direction of member 18a. Key 54 is of such dimensions that when it is secured with notch 32, a mating action takes place forming a zero clearance fit between walls 33 and 56 with a finite gap existing between surfaces 36 and 57 and walls 34 and 58. Extending from edge 59 of wall 56 in the direction of area 18a is a machined surface 61 which is generally parallel to surface 18c, and which provides a contact surface for surface 39 of area 19b. Extending from edge 62 of wall 58 is a machined surface 63 parallel to surface 61 and providing a contact surface for surface 37 of area 19b. Surface 61 is a greater vertical distance from surface 18c than is surface 63 so that areas 18b and 19b form an essentially solid rectangular block when the various contacting surfaces are brought together. Threaded bores 22b (one hidden in FIG. 4) align with bores 22a and provide securing means for cap screws 22.

End surface 64 of area 18b has an upper vertical surface portion 66 and a lower surface portion 67 which is inclined from the vertical similar to wall 58. When the half-links are in engagement end surface 64 mates with end mating surface 48 of area 19a as shown in FIG. 5. Surface portion 53 is inclined more than its mating surface portion 67 to facilitate engagement as will be described. An end mating surface 68 having a surface portion 69 and a surface portion 71 is formed on area 18a to provide a mating surface for end surface 42 of area 19b. Surface portion 68 is also inclined more than its mating surface 46.

Referring now to FIGS. 3 and 5, the various surfaces of half-link 19 are shown in contact with the corersponding mating surfaces of half-link 18 as when the link is in operation as part of a complete track. The particular design of the present invention provides a positive connection and an efficient distribution of stresses between the half-links which make possible the advantageous use of a separable link. Machined surfaces 39, 61 and 37, 63, along with vertical walls 33, 56 prevent any relative angular movement between the half-links; an important feature generally characteristic of a single piece link. Since the forces acting on the half-links generally create tensile stresses in connection areas 19b and 18b, the surfaces reacting these stresses are walls 33 and 56. By providing connection areas 19b and 18b of full link width, the stresses in connection joint 21 are distributed throughout the entire width of the link.

The pin bearing areas 18a and 19a are approximately half the width of areas 18b and 19b to allow them to be connected to the same pin as the adjacent links while maintaining a uniform link width (FIG. 3). Since the connection areas 18b and 19b provide greater area for stress distribution than either of their respective pin bearing areas, the separable link possesses another feature characteristic of a one piece link; high resistance to tensile stress. It is to be emphasized that link 17 is capable of absorbing large tensile stresses without transmitting shear forces to cap screws 22, thus insuring easy removal thereof.

The master link also possesses structural features which allow the two half-links 18 and 19 to be easily disengaged to break the continuity of track 11. As shown best in FIG. 5, half-link 19 (in broken lines) is raised vertically, after cap screws 22 are removed, a sufficient distance to place the lower edge 41 of notch wall 33 above key wall 56. The vertical distance which half-link 19 must be raised is, thus, equal to the height of wall 56.

In order to raise half-link 19 vertically a number of adjacent links must also be raised at the same time. The number of adjacent links which must be raised depends upon the necessary vertical movement of the half-link. Since track links and track shoes are of considerable weight, it is important to keep this vertical distance at a minimum, without sacricing link strength. The full link width of key 54 and notch 32 provides great strength and permits separation of the link parts with only slight vertical movement. Once the initial vertical movement is complete, disengagement is possible because walls 34, 58 are slightly angled from the vertical. Walls 34, 58 are longer than opposing walls 33, 56 to increase the size of the root of the key 54 and thereby increase its resistance to shear forces.

To engage the two half-links, edge 44 of member 19b is brought into contact with any part of surface portion 71 of member 18b, after which the weight of the track forces edge 44 to slide on surface 71 and position it in its proper location. This firmly engages the half-links and cap screws 22 are inserted. Since the engagement procedure does not include an alignment problem, it is performed with the use of tools generally available in the field.

Referring to FIG. 3, pin 31 is surrounded by bushings 81 on which is pressed the pin bearing member 26a of link 26. Pin 31 extends beyond bushing 81 and is pressed into an opening 72 in member 18a. The fit between the bushing 81 and pin 31 is sufficiently loose to permit hinging of the connected parts as the track passes around the drive sprocket and idler of the tractor. An important feature of the hinge connection, of which bushing 81 is a part, is a recess 70 in member 18a into which bushing 51 extends. Dirt or other abrasive material which tends to enter through the juncture between link 26 and member 18a is prevented from gaining entrance to the end surface contact between the bushing and the boss by recessing the bushing in the manner shown and by well known types of seals sometimes employed in the recess. Where master pins are employed as a means for separating links of an endless track the bushing of the master pin is not received in such a recess but terminates in the plane of the abutting surfaces of the links. This results in accelerated wear of the parts at the master pin joint and early failure thereof. The present invention, by eliminating the need for a master pin and substituting a workable and easily serviceable master link, permits the use of identical bushings of the preferred form throughout the entire track.

What is claimed is:

1. In a master link for an endless articulate track the combination comprising a first half-link having a bearing area integrally connected to a connection area, said first connection area of full link width and approximately one-half link depth, said first connection area having a notch along its width extending less than half its depth, said notch having a pair of side walls and a top surface wherein one of said side walls slants away from and is longer than the other, a second half-link having a bearing area integrally connected to a connection area, said second connection area of full link width and approximately one-half link depth, said second connection area having a key formed along its width, said key having a pair of side walls and a top surface wherein one of said key walls slants away from and is longer than the other, said key mating with said notch when said half-links are contacted such that said half-links form an essentially solid link.

2. In a master link for an endless articulate track the combination comprising a first half-link having a bearing area integrally connected to a connection area, said first connection area and said first bearing area forming a first continuous planar surface, said connection area having full link width and approximately one-half link depth, said first connection area having a pair of lower planar surfaces parallel to said first planar surface wherein said lower surfaces are separated by a notch along the width of said area, said notch having a pair of side walls and a top surface generally parallel to said planar surfaces, one of said side walls forming a right angle with said top surface of said notch while the other longer side wall forms an angle slightly greater than a right angle with said upper surface, a second half-link having a bearing area integrally connected to a connection area, said second connection area and said second bearing area forming a second continuous planar surface, said second connection area having full link width and approximately one-half link depth, said second connection area having a pair of upper planar surfaces parallel to said second continuous surface and separated by a key formed along the width of said second connection area, said key mating with said notch when said upper planar surfaces of said second half-link contact said lower planar surfaces of said first half-link to form an essentially solid link, said side walls of said notch and mating key having zero clearance when mated.

3. The master link as claimed in claim 2 wherein said upper planar surfaces of said second half-link and said lower planar surfaces of said first half-link are machined surfaces to provide good contact therebetween.

4. In a master link for an endless articulate track the combination comprising a first half-link having a bearing area integrally connected to a connection area, said first connection area and said first bearing area forming a first continuous planar surface, said connection area having full link width and approximately one-half link depth, said first connection area having a pair of lower planar surfaces parallel to said first planar surface wherein said lower surfaces are separated by a notch along the width of said area, said notch having a pair of side walls and a top surface generally parallel to said planar surfaces, one of said side walls forming a right angle with said top surface of said notch while the other longer side wall forms an angle slightly greater than a right angle with said upper surface, a second half-link having a bearing area integrally connected to a connection area, said second connection area and said second bearing area forming a second continuous planar surface, said second connection area having full link width and approximately one-half link depth, said second connection area having a pair of upper planar surfaces parallel to said second continuous surface and separated by a key formed along the width of said second connection area, said key mating with said notch when said upper planar surfaces of said second half-link contact said lower planar surfaces of said first half-link to form an essentially solid link, said side walls of said notch and mating key having zero clearance when mated, said first continuous surface and said lower planar surfaces are separated by a first connection area end surface, said first end surface forming a right angle with one of said lower surfaces and an angle less than a right angle with said first continuous surface, said second continuous surface and said upper planar surfaces separated by a second connection area end surface, said second end surface forming a right angle with one of said upper planar surfaces and an angle less than a right angle with said second planar surface, each of said first and second bearing areas having surfaces for contacting said connection area end surfaces when said notch and key are mated.

References Cited in the file of this patent

UNITED STATES PATENTS

| | | |
|---|---|---|
| 562,550 | Merritt | June 23, 1896 |
| 1,262,179 | Daniel | Apr. 9, 1918 |
| 2,882,102 | Rund | Apr. 14, 1959 |